US007966658B2

(12) United States Patent
Singh et al.

(10) Patent No.: US 7,966,658 B2
(45) Date of Patent: Jun. 21, 2011

(54) DETECTING PUBLIC NETWORK ATTACKS USING SIGNATURES AND FAST CONTENT ANALYSIS

(75) Inventors: Sumeet Singh, San Diego, CA (US); George Varghese, San Diego, CA (US); Cristi Estan, La Jolla, CA (US); Stefan Savage, Carlsbad, CA (US)

(73) Assignee: The Regents of the University of California, Oakland, CA (US)

( * ) Notice: Subject to any disclaimer, the term of this patent is extended or adjusted under 35 U.S.C. 154(b) by 2083 days.

(21) Appl. No.: 10/822,226

(22) Filed: Apr. 8, 2004

(65) Prior Publication Data
US 2005/0229254 A1 Oct. 13, 2005

(51) Int. Cl.
*G08B 23/00* (2006.01)
(52) U.S. Cl. ............... 726/22; 726/23; 726/13
(58) Field of Classification Search .......... 726/22
See application file for complete search history.

(56) References Cited

U.S. PATENT DOCUMENTS

| | | | |
|---|---|---|---|
| 6,477,651 B1 * | 11/2002 | Teal | 726/23 |
| 6,578,147 B1 * | 6/2003 | Shanklin et al. | 726/22 |
| 6,738,814 B1 * | 5/2004 | Cox et al. | 709/225 |
| 6,829,635 B1 * | 12/2004 | Townshend | 709/206 |
| 6,988,208 B2 * | 1/2006 | Hrabik et al. | 726/23 |
| 7,080,408 B1 * | 7/2006 | Pak et al. | 726/24 |
| 7,089,592 B2 * | 8/2006 | Adjaoute | 726/25 |
| 7,535,909 B2 | 5/2009 | Singh et al. | |
| 2002/0107953 A1 | 8/2002 | Ontiveros et al. | |
| 2003/0014662 A1 | 1/2003 | Gupta et al. | |
| 2003/0445485 | 6/2003 | Milliken | |
| 2004/0054925 A1 | 3/2004 | Etheridge et al. | |
| 2004/0064737 A1 | 4/2004 | Milliken et al. | |
| 2004/0073617 A1 | 4/2004 | Milliken et al. | |
| 2006/0098585 A1 | 5/2006 | Singh et al. | |
| 2006/0150249 A1 * | 7/2006 | Gassen et al. | 726/23 |
| 2006/0242703 A1 * | 10/2006 | Abeni | 726/23 |
| 2007/0094728 A1 * | 4/2007 | Julisch et al. | 726/23 |
| 2007/0112714 A1 * | 5/2007 | Fairweather | 706/46 |

(Continued)

FOREIGN PATENT DOCUMENTS
WO 2005/103899 11/2005

OTHER PUBLICATIONS

Bloom, Burton, "Space/time trade-offs in hash coding with allowable errors," Communications of the ACM 13(7): 422-426, 1970.

(Continued)

*Primary Examiner* — Pramila Parthasarathy
(74) *Attorney, Agent, or Firm* — Perkins Coie LLP

(57) ABSTRACT

Detecting attacks against computer systems by automatically detecting signatures based on predetermined characteristics of the intrusion. One aspect looks for commonalities among a number of different network messages, and establishes an intrusion signature based on those commonalities. Data reduction techniques, such as a hash function, are used to minimize the amount of resources which are necessary to establish the commonalities. In an embodiment, signatures are created based on the data reduction hash technique. Frequent signatures are found by reducing the signatures using that hash technique. Each of the frequent signatures is analyzed for content, and content which is spreading is flagged as being a possible attack. Additional checks can also be carried out to look for code within the signal, to look for spam, backdoors, or program code.

50 Claims, 10 Drawing Sheets

U.S. PATENT DOCUMENTS

2007/0192863 A1* 8/2007 Kapoor et al. .................. 726/23
2008/0307524 A1 12/2008 Singh et al.

OTHER PUBLICATIONS

Snort web site, www.snort.org, (accessed on May 23, 2007).

Microsoft Computer Dictionary, 5$^{th}$ Edition, Copyright 2002 by Microsoft Corporation, p. 144 (including a definition of "data reduction").

Chambers Dictionary of Science and Technology, Copyright 1999 by Chambers Harrap Publishers Ltd., p. 303 (including a definition of "data reduction").

McGraw-Hill Dictionary of Scientific and Technical Terms, 6$^{th}$ Edition, Copyright 2003, . . . by The McGraw-Hill Companies, Inc., p. 505 (including a definition of "data reduction").

Estan et al., "Building a Better NetFlow," SIGCOMM 2004 Tech Report, Portland Oregon, Aug. 30-Sep. 3, 2004 (12 pages).

Fan et al., "Summary Cache: A Scalable wide-area Web cache sharing protocol," ACM SIGCOMM 98, Vancouver, British Columbia, Sep. 2-4, 1998 (12 pages).

Graham, Paul, "A Plan for Spam," http://www.paulgraham.com/spam.html , Aug. 2002, 12 pages, (accessed May 23, 2007).

Manber, Udi "Finding Similar Files In a Large File System", Proc. 1994 Winter Usenix Technical Conference, Jan. 1994, pp. 1-10.

Moore et al., "Inferring Internet Denial-of-Service Activity," Proceedings of the 10$^{th}$ USENIX Security Symposium, Aug. 13-17, 2001, Washington, D.C, 15 pages.

Moore et al., "Internet Quarantine: Requirements for Containing Self-Propagating Code," The 22$^{nd}$ Annual Joint Conference of the IEEE Computer and Communications Societies, San Francisco, CA, U.S.A. (Apr. 1-3, 2003).

Rabin, Michael O., "Fingerprinting by random polynomials," Center for Research in Computing Technology, Harvard University, Report TR-15-91, 1981.

Singh et al., "Automated Worm Fingerprinting," OSDI '04: 6$^{th}$ Symposium on Operating Systems Design and Implementation, San Francisco, CA, U.S.A., USENIX Association, pp. 45-60 (Dec. 6-8, 2004).

* cited by examiner

TEST FOR CONTENT THAT SCANS

PACKET CODE TEST

IF SIGNATURE S PASSES A BAYESIAN SPAM TEST THEN REPORT THAT S PASSES THE SPAM TEST
*FIG. 10*
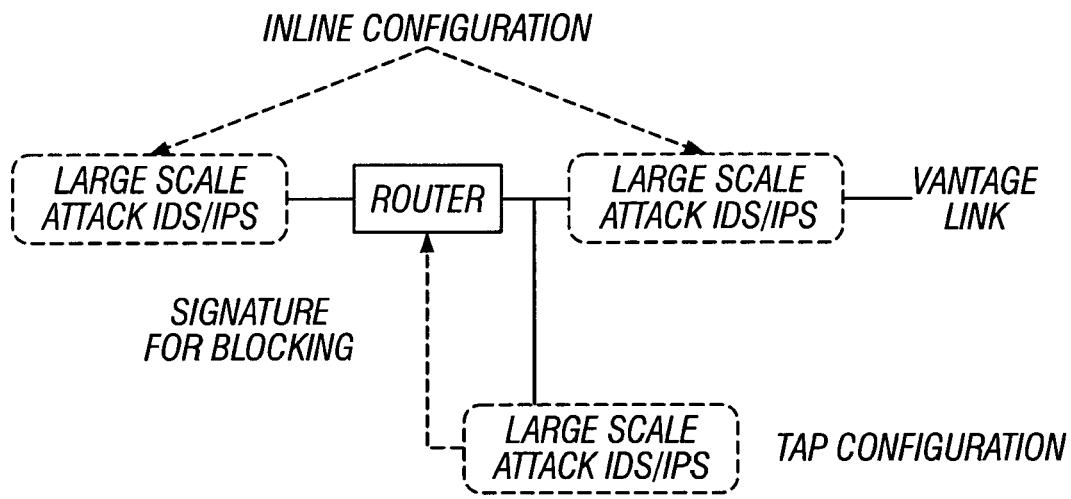
*FIG. 11A*
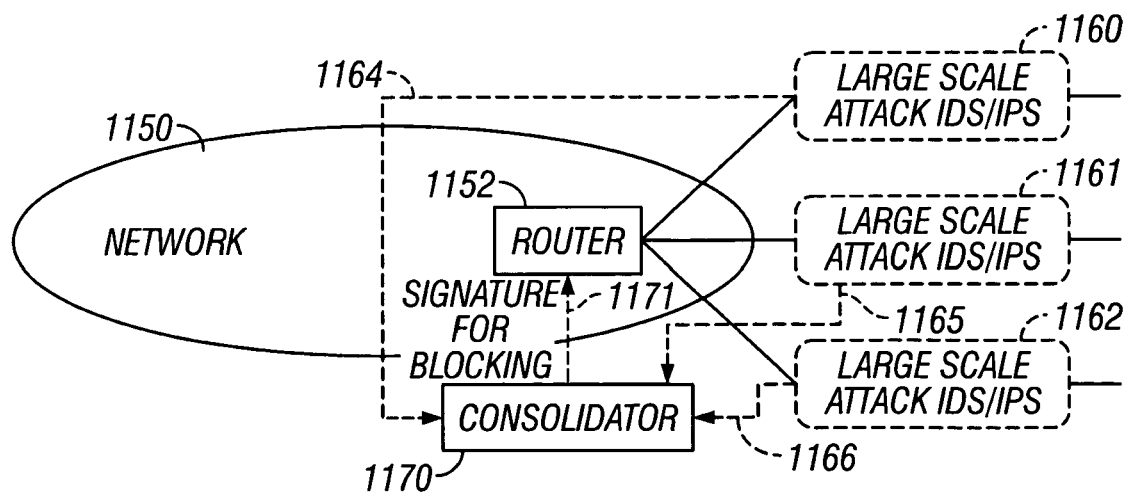
*FIG. 11B*

DETECTING PUBLIC NETWORK ATTACKS USING SIGNATURES AND FAST CONTENT ANALYSIS

This invention was made with government support under contracts ANI-0137102 and 60NANB1D0118 awarded by the National Science Foundation and the National Institute of Standards and Technology. The government has certain rights in the invention.

STATEMENT AS TO FEDERALLY-SPONSORED RESEARCH

The U.S. Government has certain rights in this disclosure pursuant to Grant Nos. 60NANB1D0118 and ANI-0137102 awarded by the Com. National Institute of Standards and Technology and National Science Foundation.

BACKGROUND

Many computers are connected to publicly-accessible networks such as the Internet. This connection has made it possible to launch large-scale attacks of various kinds against computers connected to the Internet. A large-scale attack is an attack that involves several sources and destinations, and which often (but not necessarily) involves a large traffic footprint. Examples of such large-scale attacks may include:

viruses, in which a specified program is caused to run on the computer, which then attempts to spread itself to other computers known to the host computer (e.g., those listed in the address book), denial of service attacks (DoS), in which a group of computers is exposed to so many requests that it effectively loses the ability to respond to legitimate requests. Many viruses and worms indirectly cause DoS attacks as well for networks by sending a huge amount of traffic while replicating. Distributed denial of service (DDOS) occurs when an attacker uses a group of machines (sometimes known as zombies) to launch a DoS attack. Backdoor or Vulnerability Scanning: Another form of large-scale attack is where an intruder scans for backdoors at machines or routers. A backdoor is a method by which a previously attacked machine can then be enlisted by future attackers to be part of future attacks.

Large-scale span: Spam is unsolicited network messages often sent for commercial purposes. Large-scale spam is often simply the same as (or small variants of) the spam sent to multiple recipients. Note that this definition of spam includes both email as well as newer spam variants such as Spam Sent Over Instant Messenger.

A specific form of attack is an exploit, which is a technique for attacking a computer, which then causes the intruder to take control of the target computer, and run the intruder's code on the attack machine. A worm is a large-scale attack formed by an exploit along with propagation code. Worms can be highly efficacious, since they can allow the number of infected computers to increase geometrically.

Many current worms propagate via random probing. In the context of the Internet, each of the number of different computers has an IP address, which is a 32-bit address. The probing can simply randomly probe different combinations of 32-bit addresses, looking for machines that are susceptible to the particular worm. Once the machine is infected, that machine starts running the worm code, and again begins the Internet. This geometrically progresses. However, future worms may not use random probing, so probing can only be used as one sign of a worm.

The worm can do some specific damage, or alternatively can simply take up network bandwidth and computation, or can harvest e-mail addresses or take any other desired action.

A very common exploit is a so-called buffer overflow. In computers, different areas of memory are used to store various pieces of information. One area in memory may be associated with storing information received from the network: such areas are often called buffers. However, an adjoining area in the memory may be associated with an entirely different function. For example, a document name used for accessing Internet content (e.g., a URL) may be stored into a URL buffer. However, this URL buffer may be directly adjacent to protected memory used for program access. In a buffer overflow exploit, the attacker sends a URL that is longer than the longest possible URL that can be stored in the receiver buffer and so overflows the URL which allows the attacker to store the latter portion of its false URL into protected memory. By carefully crafting an extra long URL (or other message field), the attack or can overwrite the return address, and cause execution of specified code by pointing the return address to the newly installed code. This causes the computer to transfer control to what is now the attacker code, which executes the attacker code.

The above has described one specific exploit (and hence worm) exploiting the buffer overflow. A security patch that is intended for that exact exploit can counteract any worm of this type. However, the operating system code is so complicated that literally every time one security hole is plugged, another is noticed. Further, it often takes days for a patch to be sent by the vendor; worse, because many patches are unreliable and end users may be careless in not applying patches, it may be days, if not months, before a patch is applied. This allows a large window of vulnerability during which a large number of machines are susceptible to the corresponding exploit. Many worms have exploited this window of vulnerability.

A signature is a string of bits in a communication packet that characterize a specific attack. For example, an attempt to execute the perl program at an attacked machine is often signalled by the string "perl.exe" in a message/packet sent by the attacker. Thus a signature-based blocker could remove such traffic by looking for the string "perl.exe" anywhere in the content of a message. The signature could, in general, include header patterns as well as exact bit strings, as well as bit patterns (often called regular expressions) which allow more general matches than exact matches.

While the exact definition of the different terms above may be a matter of debate, the basic premise of these, and other attacks, is the sending of undesired information to a publicly accessible computer, connected to a publicly accessible network, such as the internet.

Different ways are known to handle such attacks. One such technique involves using the signature, and looking for that signature in Internet traffic to block anything that matches that signature. A limitation of this technique has come from the way that such signatures are found. The signature is often not known until the first attacks are underway, at which point it is often too late to effectively stop the initial (sometimes called zero-day) attacks.

An Intrusion Detection System (IDS) may analyze network traffic patterns to attempt to detect attacks. Typically, IDS systems focus on known attack signatures. Such intrusion detection systems, for example, may be very effective against so-called script kiddies who download known scripts an attempt to use them over again at some later time.

Existing solutions to attacks each have their own limitations. Hand patching is when security patches from the operating system vendor are manually installed. This is often too slow (takes days to be distributed). It also requires large amounts of resources, e.g., the person who must install the patches.

A firewall may be positioned at the entrance to a network, and review the packets coming from the public portion of the network. Some firewalls only look at the packet headers; for example, a firewall can route e-mail that is directed to port 25 to a corporate e-mail gateway. The firewalls may be useful, but are less helpful against disguised packets, e.g., those disguised by being sent to other well-known services.

Intrusion detection and prevention systems, and signature based intrusion systems look for an intrusion in the network. These are often too slow (because of the time required for humans to generate a signature) to be of use in a rapidly spreading new attack.

Other systems can look for other suspicious behavior, but may not have sufficient context to realize that certain behavior accompanying a new attack is actually suspicious. For example, a common technique is to look for scanning behavior but this is ineffective against worms and viruses that do not scan. This leads to so-called false negatives where more sophisticated attacks (increasingly common) are missed.

Scanning makes use of the realization that an enterprise network may be assigned a range of IP addresses, and may only use a relatively small portion of this range for the workstations and routers in the network. Any outside attempts to connect to stations within the unused range may be assumed to be suspicious. When multiple attempts are made to access stations within this address space, they may increase the level of suspicion and make it more likely that a scan is taking place.

This technique has been classically used, as part of the so-called network telescope approach.

SUMMARY

The present application defines a new technique of automatically determining an unknown attack. This is done by looking for specified different commonalities among the different attacks, and can be used to automatically generate information indicative of the new attack, e.g., a signature for the new attack.

The embodiments describe detecting commonalities including content replication, increasing levels of sending, scanning, executable code, and/or spam keywords.

An aspect of this system defines scalable data reduction techniques to detect the commonalities referred to above. These scalable techniques enable the monitoring of network data for any desired size network apparatus that can be implemented at various speeds ranging from the highest speed links (currently at 40 Gbps) to lower speed local links within local networks.

BRIEF DESCRIPTION OF THE DRAWINGS

These and other aspects will now be described in detail with reference to the accompanying drawings, wherein:

FIG. 10 shows details of the Spam test;

FIGS. 11A and 11B show different forms of the intrusion detection and prevention system configurations.

DETAILED DESCRIPTION

Figure 1:
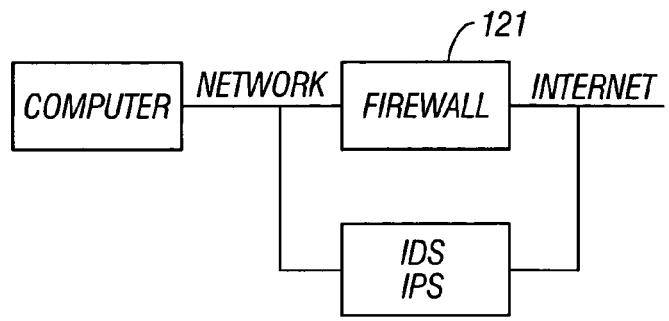
FIG. 1 shows a basic view of the computer on the network with a firewall and an intrusion detection/prevention system.

FIG. 1 shows a basic embodiment of a computer system 100 connected to a publicly available network 110. While the publicly available network is shown and described herein as being the Internet, it should be understood that this can be used with any network connected to any computer. An entry device 120 sits between the network 110 and the computer 100. The entry device may include the functionalities described throughout this specification.

Internet messages are sent in packets including headers that identify the destination and/or function of the message. An IP header identifies both source and destination for the payload. A TCP header may also identify destination and source port number. The port number identifies the service which is requested from the TCP destination in one direction, and from the source in the reverse direction. For example, port 25 may be the port number used commonly for e-mail; port number 80 is often used for FTP and the like. The port number thus identifies the specific resources which are requested.

An intrusion is an attempt by an intruder to investigate or use resources within the network 110 based on messages over the network. A number of different systems are in place to detect and thwart such attacks.

The inventors have discovered commonalities between the different kinds of large-scale attacks, each of which attack a different security hole, but each of which have something in common.

Typical recent attacks have large numbers of attackers. Typical recent attacks often increase geometrically, but in any case the number of infected machines increases.

Attacks may often be polymorphic, that is they change their content during each infection in order to thwart signature based methods.

The present technique describes using properties of an attack to detect properties of the new attack, by detecting patterns in data. Effectively, this can detect an attack in the abstract, without actually knowing anything about the details of the attack. The detection of attack can be used to generate a signature, allowing automatic detection of the attack. Another aspect describes certain current properties which are detected, to detect the attack.

A technique is disclosed which identifies characteristics of an abstract attack. This abstract attack looks for properties in network data which make it likely that an attack of new or previous type is underway.

The present disclosure describes a number of different properties being viewed; however it should be understood that these properties could be viewed in any order, and other properties could alternatively be viewed, and that the present disclosure only describes a number of embodiments of different ways of finding an attack under way.

One aspect of the disclosed technique involves looking through large amounts of data. An aspect discloses a truly brute force method of looking through this data; and this brute force method could be usable if large amounts of resources such as memory and the like are available. Another aspect describes scalable data reduction techniques, in which patterns in the data are determined with reduced resources (specifically, smaller configurations of memory and processing.)

Figure 2:
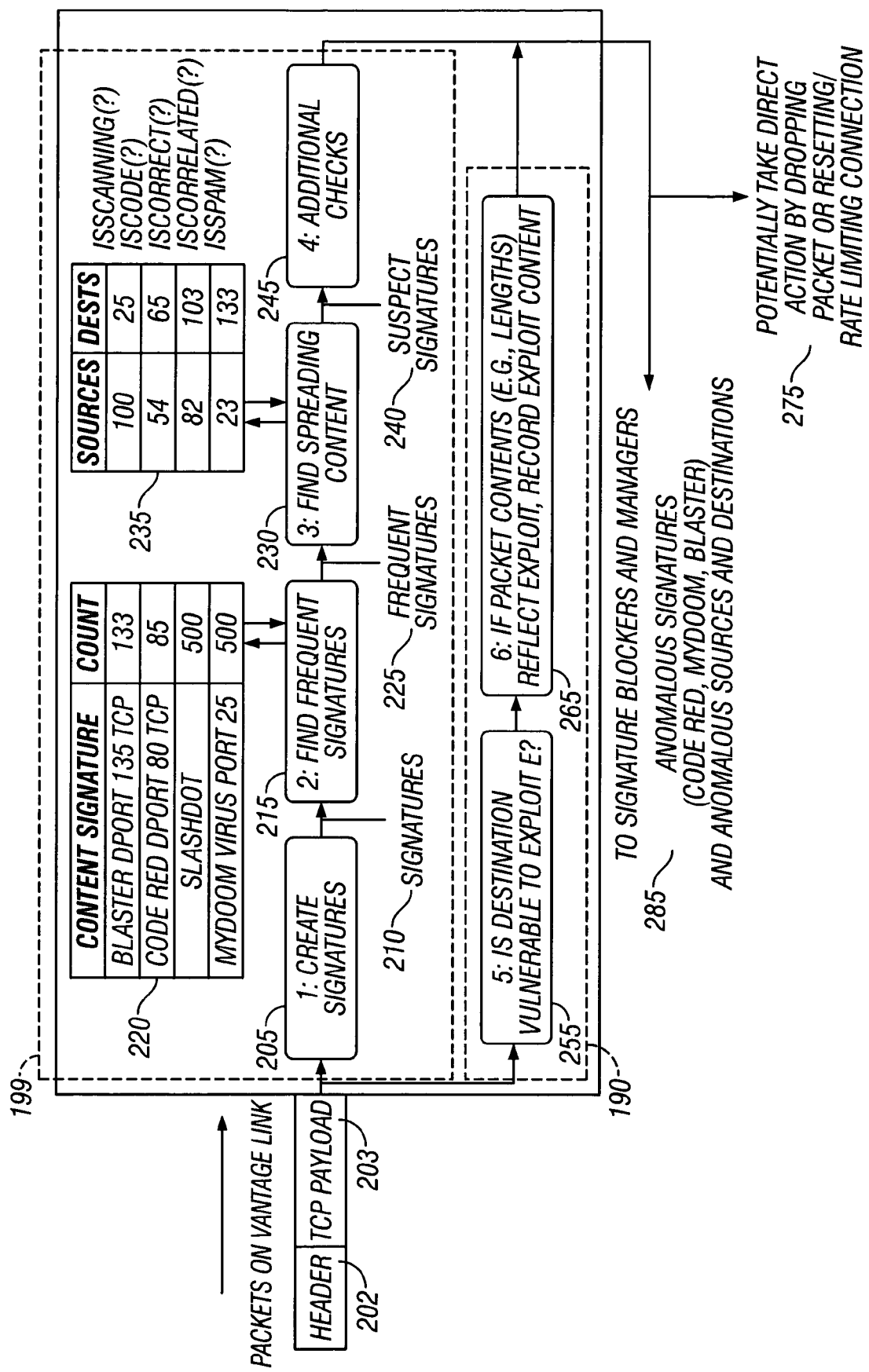
FIG. 2 shows a block diagram of the system of the present system including the various block.

FIG. 2 shows a basic block diagram of an embodiment. Portions of data on a network, e.g., packets 200 are found by examining network messages coming in on a vantage link, which can be, for example, any vantage point which can read data portions from the network. The packet data is analyzed in two parallel analysis blocks. A content checker Part 199 includes parts 205, 215, 230 and 245 in FIG. 2. A destination checker Part 190 includes Parts 255 and 265 in FIG. 2. Both parts extract anomalous signatures from different criteria. The destination checker 190 is based on a special assumption that there is known vulnerability in a destination machine. This makes the problem easier and faster. The content checker Part 199 makes no such assumption. The parts can be implemented in parallel to reduce computation time.

The destination checker 190 analyzes the packets 200 for known vulnerabilities such as buffer overflows. At 255, a list of destinations that are susceptible to known vulnerabilities is first consulted to check whether the destination of the current packet being analyzed is on the list. Such a list can be built by a scan of the network prior to the arrival of any packets containing an attack and/or can be maintained as part of routine network maintenance.) If the specific destination is susceptible to a known vulnerability, then the packet is intended for that destination parsed at 265 to see whether the packet data conforms to the vulnerability. For example, in a buffer overflow vulnerability for say a URL, the URL field is found and its length is checked to see if the field is over a pre-specified limit. If the packet passes the tests in 255 and 265, the relevant contents of the packet that exploit the vulnerability (for example, the contents of the field that would cause a buffer overflow) are passed to the output as an anomalous signature, together with the destination and source of the packet.

Content analysis 199 creates anomalous signatures for attacks that are not necessarily based on known vulnerabilities. At 205, "signatures" that are indicative of the information in the packets are created. The signatures can represent a reduced data portion of the information, or a portion or slice of the information, for example. These signatures are analyzed through the techniques of FIG. 2 to determine "common content".

At 215, the signatures 210 are analyzed to determine frequent content within the data itself, as the common content.

It has been found that large attacks against network resources typically include content which repeats an unusual number of times. For example, the content could be TCP or IP control messages for denial of service attacks. By contrast, worms and viruses have content that contains the code that forms the basis of the attack, and hence that code is often repeated as the attack propagates from computer to computer. Spam has repeated content that contains the information the spammer wishes to send to a large number of recipients.

Only the frequent signatures are likely to be problems. For example, a signature that repeats just once could not represent a large-scale attack. At most, it represents an attack against a single machine. Therefore, the frequent signatures 225 which have been found at 215 may be further analyzed to determine if it is truly a threat, or is merely part of a more benign message.

The signatures found to be frequent signatures at 215 are further analyzed to detect spreading content at 230 as the common content. This spreading content test determines whether a large (where "large" is defined by thresholds that can be set to any desired level) number of attackers or attacked machines are involved in sending/receiving the same content. The content is "common," in the sense that the same frequent signatures are being sent. During a large-scale attack, the number of sources or destinations associated with the content may grow geometrically. This is in particular true for worms and viruses. For spam, the number of destinations to which the spam content is sent may be relatively large; at least for large-scale spam. For denial of service attacks, the number of sources may be relatively large. Therefore, spreading content may be an additional factor representing an ongoing attack.

The frequent and spreading signatures found at 240 may then be subjected to additional checks at 245. These additional checks can check for code, spam, backdoors, scanning and correlation. Each of these checks, and/or additional checks, can be carried out by modules, either software based, hardware based, or any combination thereof.

In order to launch an attack, it may be necessary to communicate with vulnerable sources. Scanning may be used to find valid IP addresses to probe for vulnerable services. Probing of unused addresses and/or ports can be used for this determination. However it is possible that future attacks may modify their propagation strategies to use pre-generated addresses instead of probing. Therefore, this invention uses scanning only as an "additional sign of guilt" which is not necessary to output an anomalous signature.

Correlation refers to the fact that a piece of content sent to a set of destinations in a measurement interval is followed, in a later measurement interval, by some fraction of these destinations acting as sources of the content. Such correlation can imply causality wherein infections sent to stations in the earlier interval are followed by these stations acting as infecting agents in the later interval.

Figure 8A:
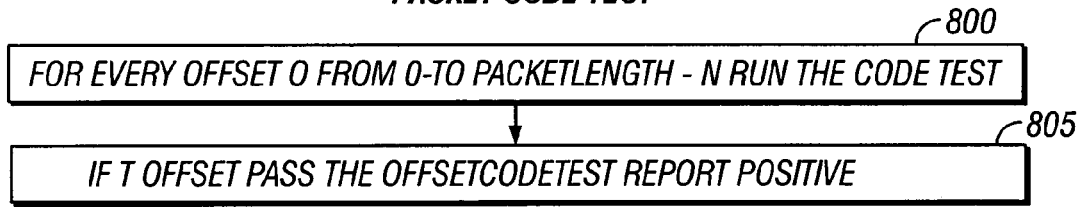
FIGS. 8a and 8b show the code test operations.

Besides scanning and correlation, the presence of executable code segments is also an "additional sign of guilt". Worms and certain other attacks are often characterized by the presence of code (for example, code that can directly execute on Windows machines) in the attack packets they send. Therefore, in analyzing content to determine an infestation, the repeatable content is tested against parameters that determine executable code segments. It is unlikely that reasonably large segments of contiguous packet data will accidentally look like executable code; this observation is the basis of special techniques for determining code that are described herein with reference to FIGS. 8a and 8b. In one aspect, a check is made for Intel 8086 and Unicode executable code formats.

Spam is characterized by an additional sign of guilt such as keywords based on heuristic criteria.

Note that while worms may evince themselves by the presence of reasonably large code fragments, other attacks such as Distributed Denial of Service may be based on other characteristics such as large amounts of repetition, large number of sources, and the reception of an unusually large number of TCP reset messages.

These additional checks 245 may be optional, any number of, all of, or none of these tests may be used.

The above has described mechanisms for analyzing content to detect attack signatures and sources and destinations. It should be understood, however, that the brute force method of analyzing content (e.g., in 215 and 230) could occupy incredible amounts of data storage. For example, commonly used vantage links that operate at 1 Gigabit per second, easily produce terabytes of packet content over a period of a few hours. Accordingly, a general data reduction technique may be used. It should be understood, however, that in one aspect, the other detection techniques may be used without the general data reduction technique. According to an aspect, a data reduction technique is used as part of the detection at 205, 215, 230 and/or 245.

In one aspect, anomalous signatures may be established when any frequent content found by 215 meets an additional test found by 230 or 245. According to another aspect, the signatures may be scored based on the amount on indicia they include. In any case, the information is used at 285, to form "anomalous signatures" which may be used to block operations, or may be sent to a bank of signature blockers and managers.

In addition to the signature, if a packet signature is deemed to be anomalous according to the tests above, the destination and source of the packet may also be passed (285) to the output. This can be useful, for example, to track which machines in a network have been attacked, and which ones have been infected.

At 275, the protection device may also (in addition to passing the signature, source, and destination) take control actions by itself. Standard control actions that are well known in the state of the art include connection termination (where the TCP connection containing the suspicious signature is terminated), connection rate limiting (where the TCP connection is not terminated but slowed down to reduce the speed of the attack), packet dropping (where any packet containing the suspicious content is dropped with a certain probability). Note that when the attack is based on a known vulnerability (255, 265) packet dropping with probability 1 can potentially completely prevent an attack from coming into a network or organization.

Figure 5:
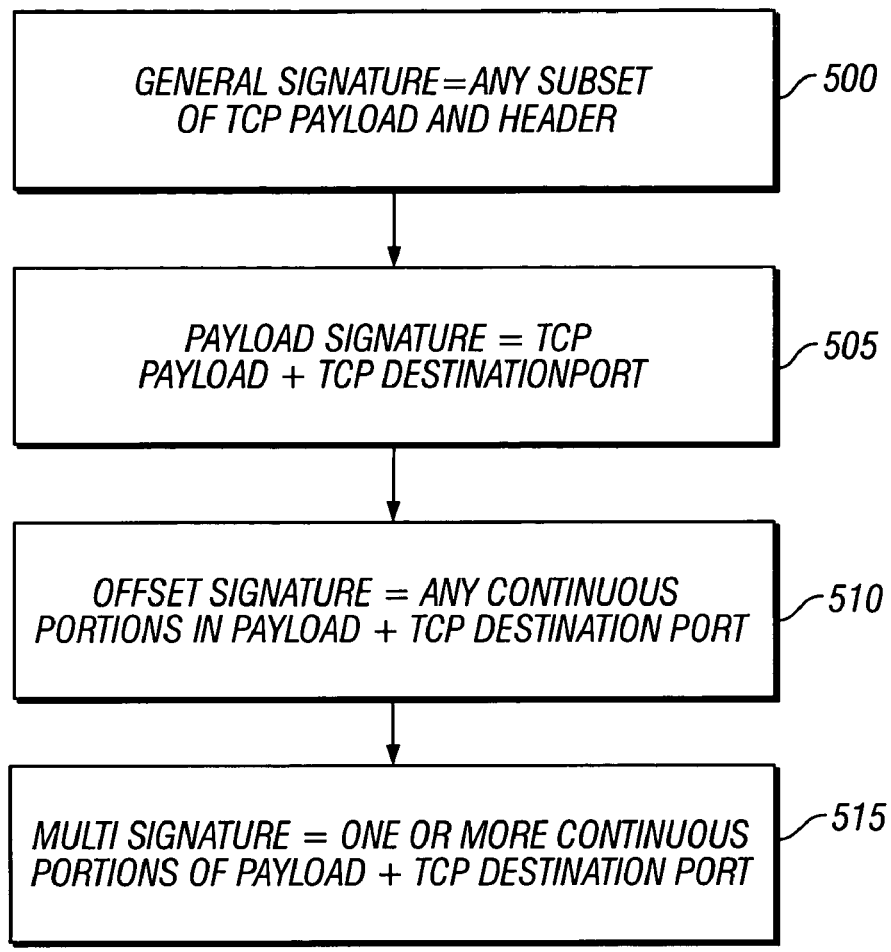
FIG. 5 shows a technique of obtaining different data portions from network packets to be used as signatures.

Signature Computation Block (205): The signature computation block is detailed with respect to FIG. 5. The signature S can simply be any subset of the TCP payload and/or header. FIG. 5 shows the different alternatives for the signatures. A general signature can simply be any subset, shown in 500. A specific payload signature can be formed from the TCP payload added to or appended to the TCP destination (or source) port shown as 505. This signature recognizes that many attacks target specific destination (or in some limited cases, source) ports. An offset signature is based on the recognition that modern large-scale attacks may become polymorphic—that is, may modify the content on individual attack attempts. This is done to make each attack attempt look like a different piece of content. Complete content change is unlikely, however. Some viruses add small changes, while others encrypt the virus but add a decryption routine to the virus. Each contains some common piece of content; in the encryption example, the decryption routine would be the common piece of content.

The attack content may lie buried within the packet content and may be repeated, but other packet headers may change from attack to attack. Thus, according to another aspect, shown as the offset signature 570, the signature is formed by any continuous portion in payload, appended to the TCP destination port. Therefore, the signature 510 investigates for content repetition strings anywhere within the TCP payload. For example, the text "hi Joe" may occur within packet 1 at offset 100 in a first message, and the same text "hi Joe" may occur in packet 2 at offset 200. This signature 510 allows counting that as two occurrences of the same string despite the different offsets in each instance.

The evaluation of this occurrence is carried out by evaluating all possible substrings in the packet of any certain length. A value of a substring length can be chosen, for example, 40 bytes. Then, each piece of data coming in may be windowed, to first look for bytes 1 through 40, then look for bytes 2 through 41, then look for bytes 3 through 42. All possible offsets are evaluated.

The length of substrings may be selected a trade-off depending on the desired amount of processing. Longer substrings will typically have fewer false positives, since it is unlikely that randomly selected substrings can create repetitions of a larger size. On the other hand, shorter substrings may make it more difficult for an intruder to evade attacks.

Certain attacks may chop the attack into portions which are separated by random filler. However, this will still find several invariant content substrings within the same packet.

The multi-signature 515 may be used to combat these kinds of attacks, formed by one or more continuous portions of payload, and the destination port. The multi-signature, is formed by one or more continuous portions of a packet concatenated with a destination port.

Find Frequent Signature Block

After computing a signature 210 at 205, the signature is subjected to the frequent signature test at 215. The find frequent signatures operation 215 is detailed with reference to the flowchart of FIG. 3.

The content repetition can be any pre-specified set of bytes within the packet at any location. This may include a part of the header or the payload or just a portion of the payload.

The simplest way of looking for this content is to simply store each item within each message in a database. However, this could require a massive amount of storage at the detection device. An embodiment describes scalable data reduction techniques to avoid this excessive memory usage.

At 300, a data reduction signature is taken of a string S, within the received network content. The data reduction takes each item of data, which can be a fixed size or a variable size, and reduces that data to something less, but which reduced data has a constant predetermined relation with the original data. The process must be repeatable, e.g., each time the same original data is received, the same reduced data will be produced. However, information theory dictates that at least certain other data will also produce the same reduced data.

A specific data reduction technique which is described herein is hashing. Hashing is a set of techniques to convert a long string or number into a smaller number. A simple hashing technique is often to simply remove all but the last three digits of a large number. Since the last three digits of the number are effectively random, it is easy way to characterize something that is referred by a long number. For example, U.S. Pat. No. 6,398,311 can be described simply 'the 311 patent'. However, much more complex and sophisticated forms of hashing are known.

In one example, assume the number 158711, and that this number must be assigned to one of 10 different hashed "bins" by hashing the number to one of 10 bins. One hashing technique simply adds the digits 1+5+8+7+1+1 equals 23. The number 23 is still bigger than the desired number of 10. Therefore, another reduction technique is carried out by dividing the final number by 10, and taking the remainder ("modulo 10"). The remainder of 23 divided by 10 is 3. Therefore, in 158711 is assigned to bin 3. In this technique, the specific hash function is:

add all the digits;

take the remainder when divided by 10.

The same hash function can be used to convert any string into a number between 0 and 9. Different numbers can be used to find different hashes.

The hash function is repeatable, that is, any time the hash function receives the number 158711, it will always hash to bin 3. However, other numbers will also hash to bin 3. Any undesired string in the same bin as a desired string is called a hash collision.

Many other hash functions are known, and can be used. These include Cyclic Redundancy Checks (CRCs) commonly used for detecting errors in packet data in networks, a hash functions based on computing multiples of the data after division by a pre-specified modulus, the so-called Carter-Wegman universal hash functions (the simplest instantiation of which is to multiply the bit string by a suitably chosen matrix of bits), hash functions such as Rabin hash functions based on polynomial evaluation, and one-way hash functions such as MD-5 used in security. This list is not exhaustive and it will be understood that other hash functions and other data reduction techniques can be used.

A specific aspect of the windowing embodiment (510) allows adding a part of the hash and removing a part when moving between two adjacent substrings. One aspect of this embodiment, therefore, may use an incremental hash function. Incremental hash functions make it easy to compute the hash of the next substring based on the hash of the previous substring. One classic incremental hash function is a Rabin hash function (used previously by Manber in spotting similarities in files instead of other non-incremental hashes (e.g., SHA, MD5, CRC32).

Large payloads may contain thousands of bytes, and according to one aspect, the content is data reduced at 300. 64-bit content may be sufficient to minimize the probability of hash collisions, so the data reduction may be, for example, a hash to 64 bits.

The string S may include information about the destination port. The destination port generally remains the same for a worm, and may distinguish frequent email content from frequent Web content or peer-to-peer traffic in which the destination port changes.

Figure 3:
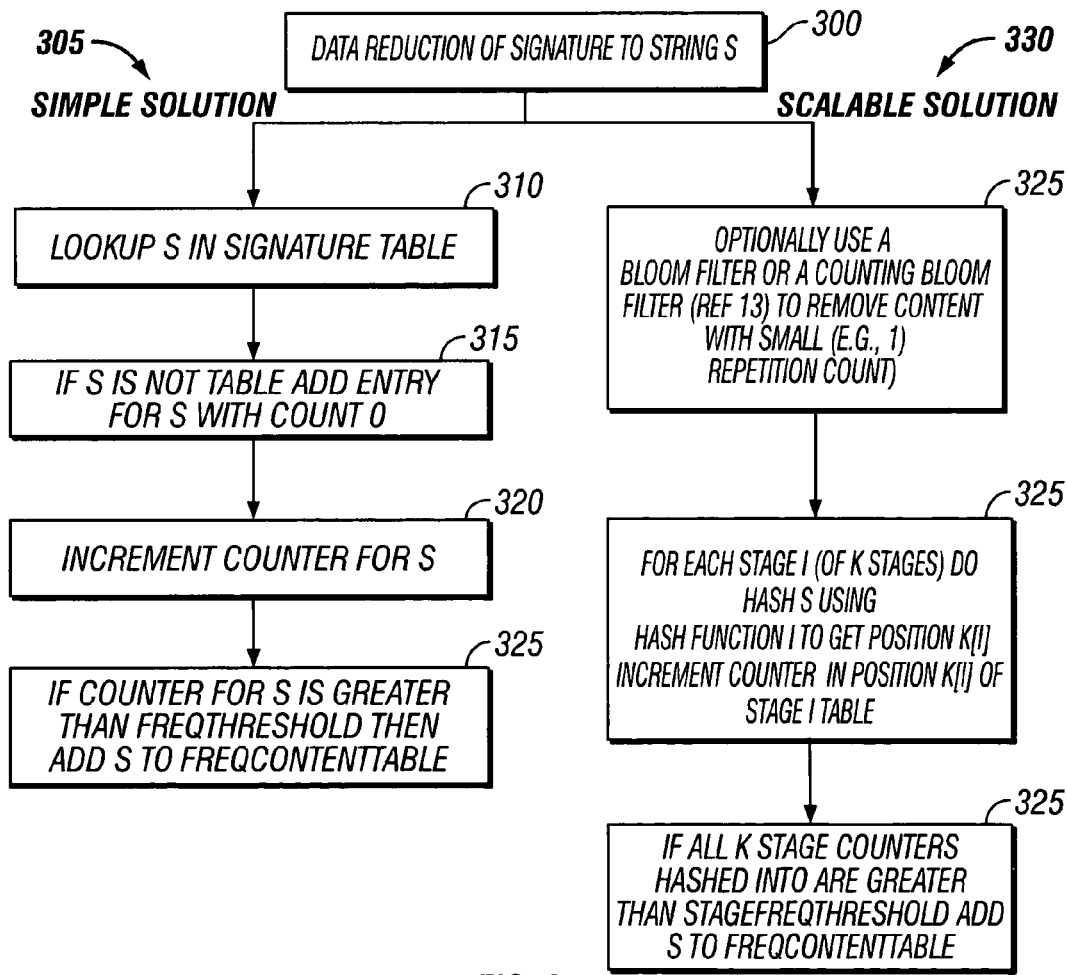
FIG. 3 shows a data reduction technique including both a scalable solution and a simple solutions.

FIG. 3 shows two different alternatives for detecting the frequent content. In the simple alternative, shown as 305, a signature table is maintained. At 310, the string S is looked up in the signature table. If S is not in the table, it is added to the table at 315, along with a count of 0. However, if S is in the table, then the count associated with S is incremented at 320.

A frequency threshold is also defined. If the count for S exceeds the frequency threshold, then S is added to the frequent content table at 325. Periodically, each of the counters is reset, so that the frequent content test effectively requires the frequent content to be received in a specified time period.

The table formed in the simple solution 305 may be huge, and therefore a scalable solution is shown as 350. According to the scalable solution, a data reduction hash is first carried out.

An optional front end test that is commonly used is described in 351. One technique is to use a Bloom Filter as described in "Burton Bloom: Space/time tradeoffs in hash coding with allowable errors. Communications ACM, 1970" or a counting Bloom Filter as described in L. Fan, P. Cao, J. Almeida, and A. Broder. Summary Cache: A Scalable wide-area Web cache sharing protocol SIGCOMM 98, 1998, to sieve out content that is repeated only a small number of times. While Bloom filters are a reasonable front end and may suffice in some applications where memory is not expensive, they still require a few bits per piece of unique content and hence are not completely scalable.

For a more scalable analysis of frequent content, at 355, a number k of hash stages are established. Each stage I hashes the value S using a specified hash function Hash (I), where Hash(I) is a different hash function for each stage I. For each of those stages, a specific position, k(I) is obtained from the hashing. The counter in position k(I) is incremented in each of the k stages. Then, the next I is established. Again, there are k stages, where k is often at least three, but could even be 1 or 2 in some instances.

At 360, the system checks to see if all of the k stage counters that incremented by the hash, for a specific string S, are greater than a stage frequency threshold. S is added to the frequent content table only when all of the k counters are all greater then the threshold.

Figure 4:
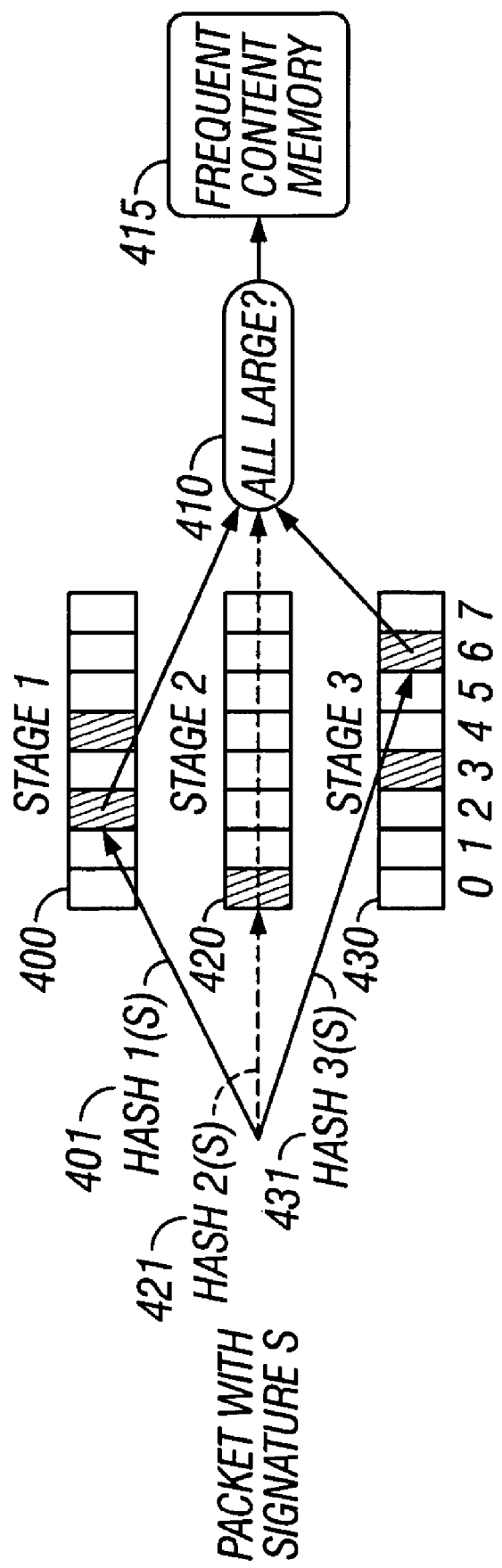
FIG. 4 shows the scalable solution using a hash solutions.

FIG. 4 illustrates the scalable technique 350 for k=3; a 3 stage hash. Each stage is a table of counters which is indexed by the associated hash function (Hash(I)) that is computed based on the packet content.

At the beginning of each measurement interval, all counters in each stage are initialized to 0. Each packet comes in and is hashed by a hash function associated with the stage. The result of the hash is used to set a counter in that stage. For example, the packet S is hashed by hash function 401 in order for the first stage 400. This produces a result of 2, shown incrementing counter 2 in the first stage array 400. The same packet S is also hashed using hash function 2 (421), and increments counter 0 in the second stage array 420. Similarly, and analogously, the packet S is hashed by hash function three (431), which hashes to counter 6 of the third stage 430. The same packet hashes to three different sections (in general, though there is a small probability that these sections may coincide) in the three different counter stages.

The stage detector 410 detects if the counters that have currently been incremented are each above the frequency threshold. The signature is added to the frequent content memory 415 only when all of the stages that have been incremented above the stage frequency threshold.

As examples, the first hash function 301 could sum digits and take the remainder when divided by 13. The second hash function 321 could sum digits and take the remainder when divided by 37. Hash function 331 could also similarly be a third independent function. In practice, it parameterized hash functions may be used, with different parameters for the different stages, to produce different but independent instances of the hash function.

The use of multiple hash stages with independent hash functions reduces the problems caused by multiple hash collisions. Moreover, the system is entirely scalable. By simply adding another stage, the effect of hash collisions is geometrically reduced. Moreover, since the memory accesses can be performed in parallel, this can form a very efficient, multi-threaded software or hardware implementation.

Spreading Content Test:

Once a frequent signature is found at 215, 230 investigates whether the content is spreading characteristic. This is done by looking for and counting, sources and destinations associated with the content.

Figure 6A:
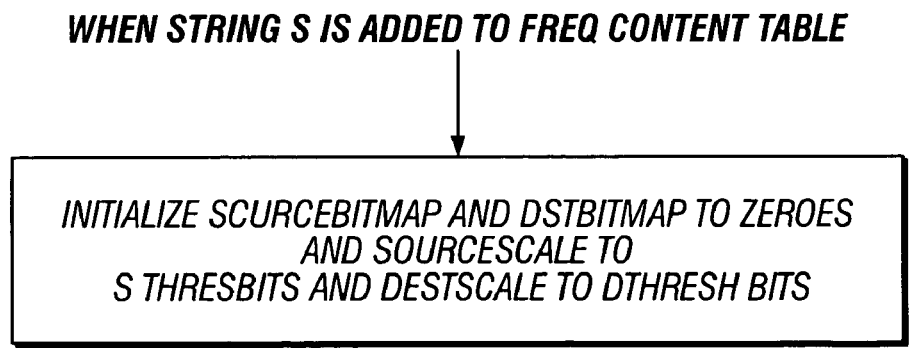
FIGS. 6a-6d show different systems of detecting increasing numbers of sources and destinations.

FIG. 6a shows a flowchart of a simplistic and brute force way of doing this. According to FIG. 6a, a table of all unique sources and all unique destinations is maintained. Each piece of content is investigated to determine its source and its destination. For each string S, a table of sources and a table of destinations are maintained. Each unique source or destination may increment respective counters. These counters maintain a count of the number of unique sources and unique destinations.

When the same string S comes from the same source, the counter is not incremented. When that same string does come from a new source, the new source is added as an additional source and the unique source counter is incremented. The destinations are counted in an analogous way. The source table is used to prevent over-counting the number of sources. That is, if Sally continually sends the message "hi Joe", Sally does not get counted twice.

Figure 6B:
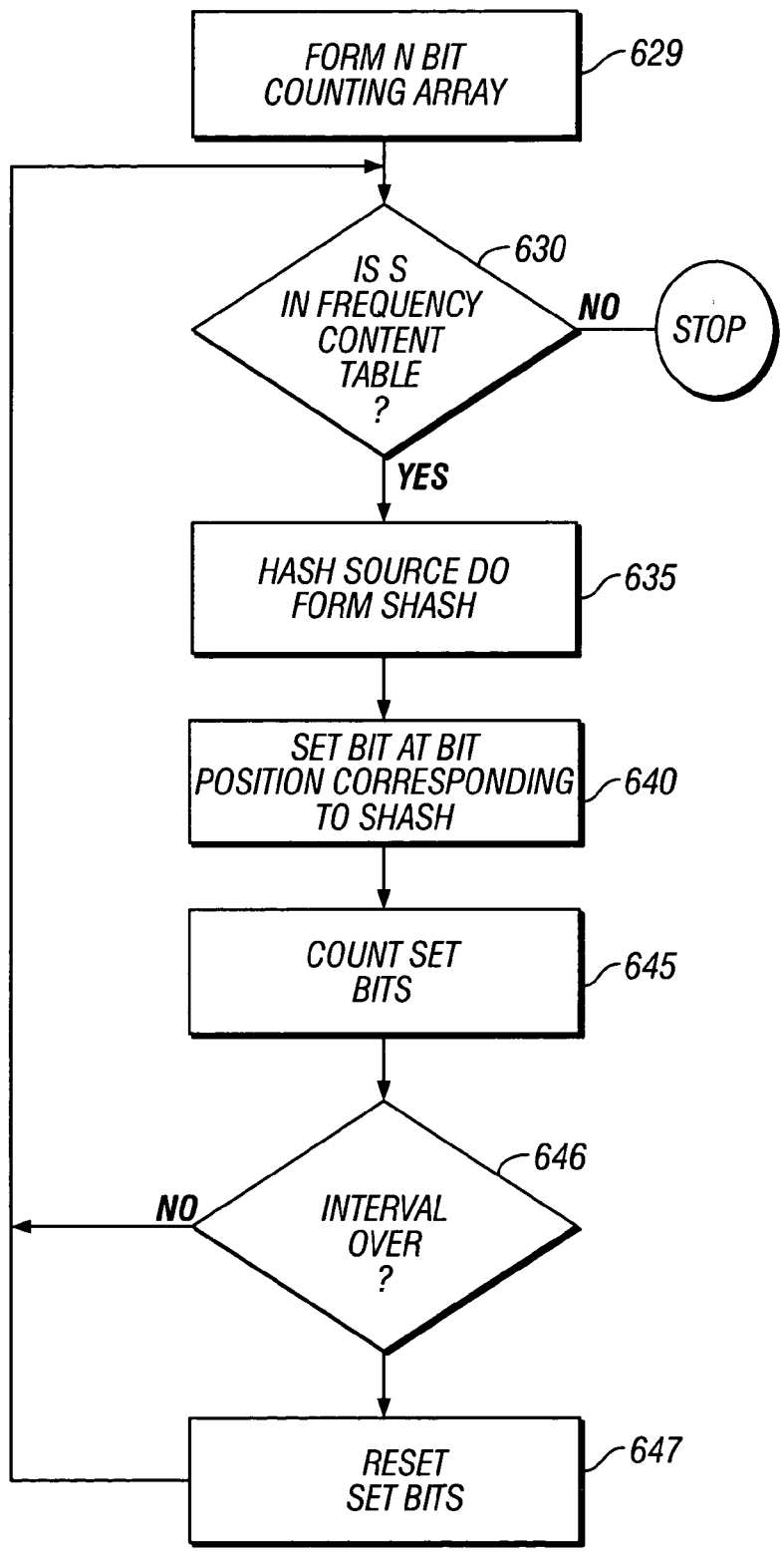

During a large attack, millions or billions of sources and destinations may be involved. FIG. 6b describes a data reduction technique that may be used in place of a huge table of unique sources and destinations.

First, at 629, an N bit count array is maintained where each bit may be 0 or 1, and the array has N positions, 630, the string S is reviewed against the frequent content table. If S is not within the table, no further steps are taken.

At 635, the source IP address is hashed, using a specified function, to form a W bit hash value $S_{hash}$. At 640, the hash value $S_{HASH}$ is used to "set" the bit at a corresponding bit position within the count array, if not already set. A running counter at 645 can maintain the number of set bits, or alternatively, the number of set bits can be counted at the end of each interval. 646 tests for the end of an interval, and resets the bits of the counter when the interval end is detected at 647.

The count of bits can be weighted by the probability of hash collisions, in order to get a more accurate count of numbers of sources and destinations.

This technique essentially stores a bitmap; one bit per source, instead of the entire 32-bit IP source table.

While the bitmap solution is better than storing complete addresses, it still may require keeping hundreds of thousands of bits per frequent content. Another solution carries out even further data compression by using a threshold T which defines a large value. For example, defining T as 100, this system only detects values that are large in terms of sources. Therefore, no table entries are necessary until more than 100 sources are found.

It also may be desirable to know not only the number of sources, but the rate of increase of the sources. For example, it may be desirable to know that even though a trigger after 100 sources is made, that in the next second there are 200 sources, in the second after that there are 400 sources, and the like.

Figure 6C:
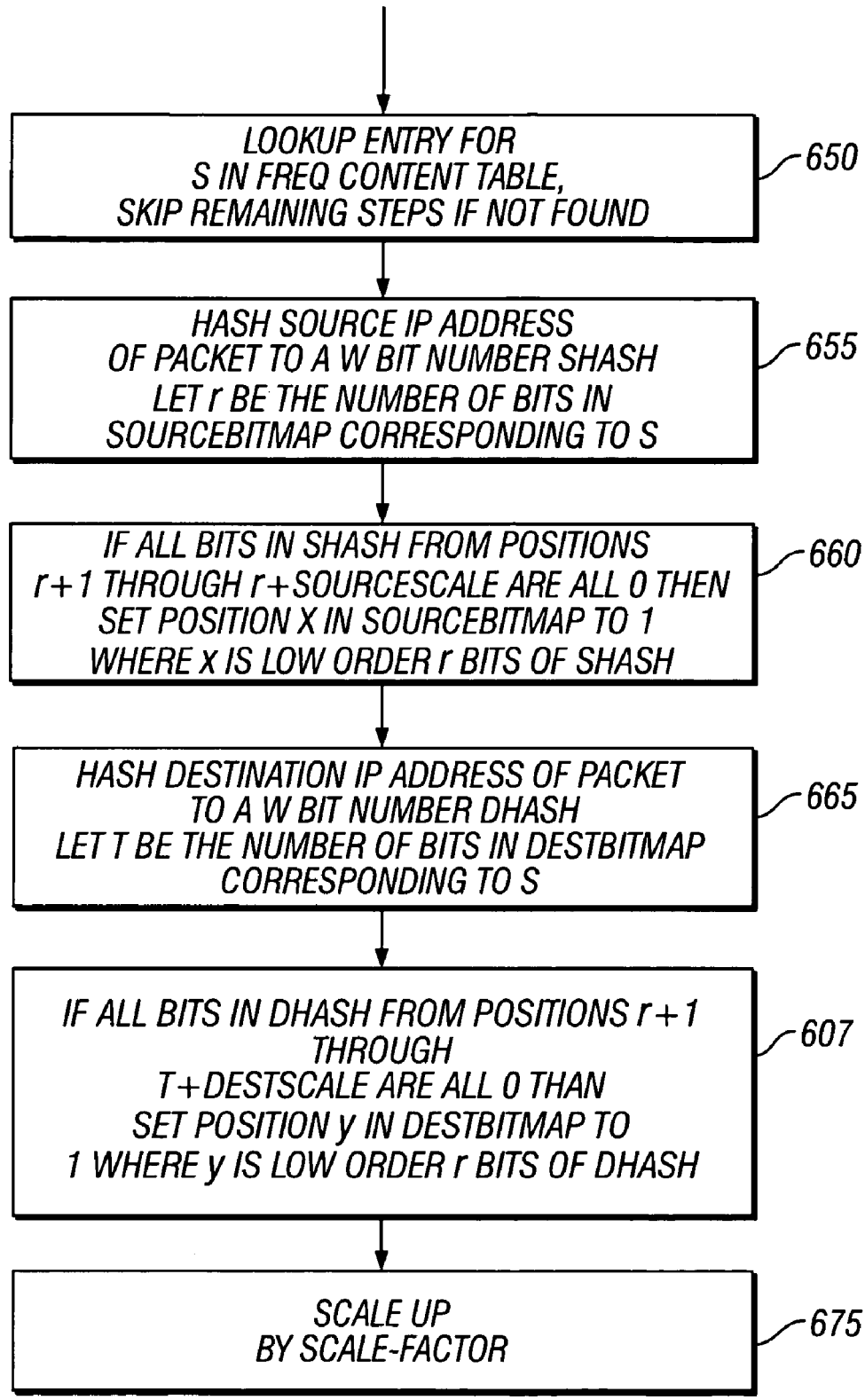

FIG. 6c shows a system which allows scaling, e.g., by a scale factor, during the counting.

This system uses only a small portion of the entire bit map space.

At 650, a check is made to see if the signature is a frequent signature, if not, it skips the remaining steps. At 655, the IP address is hashed to a W bit number $S_{HASH}$. At 660, only certain bits of that hash are selected, e.g. the low order r bits. That is, this system scales down the count to only sampling a small portion of the bitmap space. However, the same scaling is used to estimate the complete bitmap space.

The same operations are carried out on the destination address at 605 and 670.

For example, an array of 32-bit (i.e., r=32) may be maintained, where the threshold T is 96. Each source of the content is hashed to a position between 1 and 96. If the position is between 1 and 32, then it is set. If the position is beyond 32, then it is ignored, since there is no portion in the array for that bit.

At the end of the interval at 675, the number of bits set into the 32-bit array is counted, and corrected for collisions. The value is scaled up based on the number of bits which were ignored. Thus, for any value of T, the number of bits set within the available portion of the registers is counted, and scaled by a factor of T. For example, in the previous example, if we had hashed from 1 to 96 but only stored 1 through 32, the final estimate would be scaled up by a factor of 3.

Figure 6D:
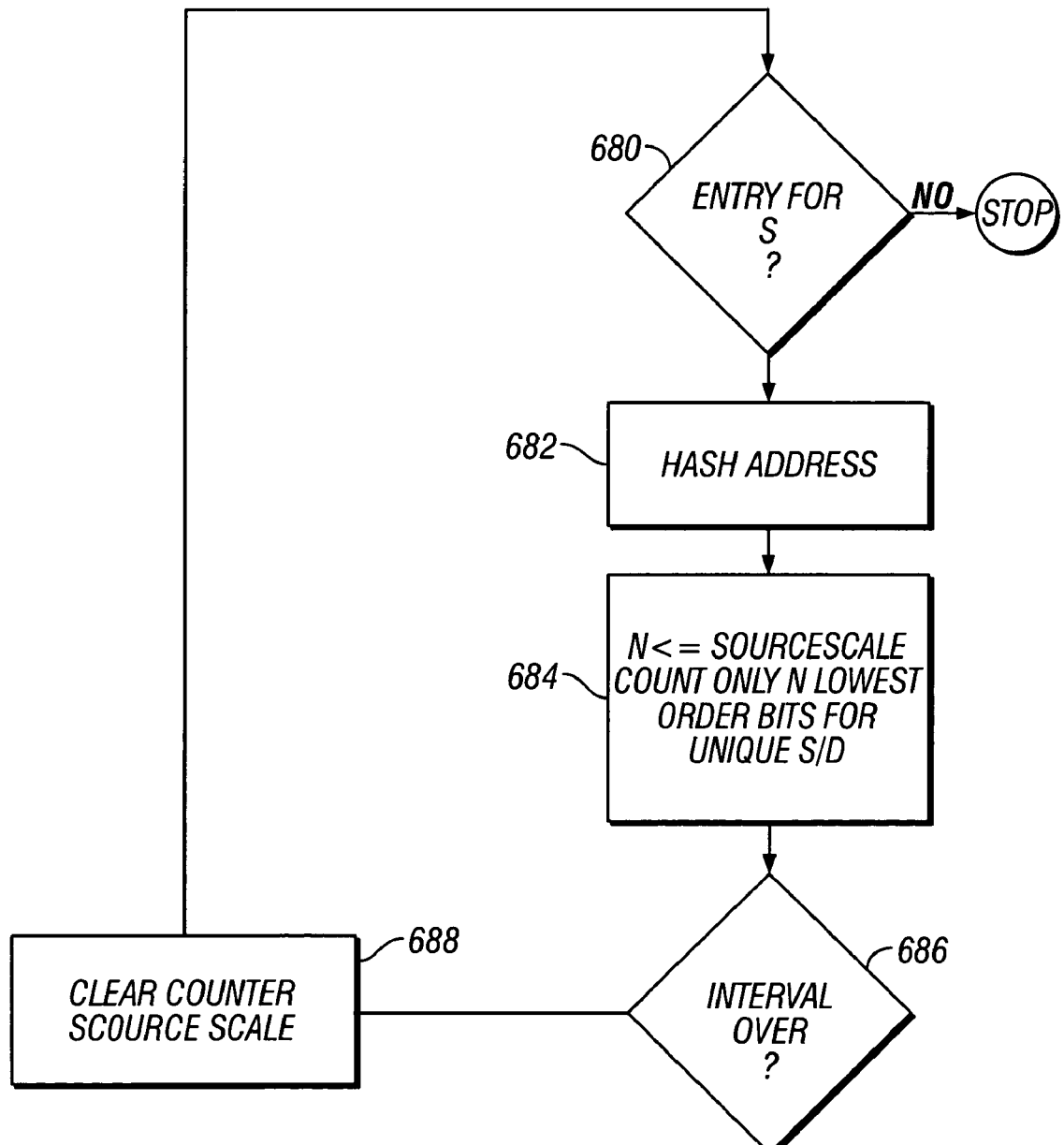

FIG. 6d illustrates a technique of using this scaling to count a rising infection over several intervals, by changing the scaling factor. A different scaling factor is stored along with the array in each interval. This technique can, therefore, reliably count from a very small to a very large number of sources with only a very small number of bits, and can also track rising infection levels.

The address is hashed at 682. A scale factor for sources is denoted by SourceScale. At 684 only if the high order bits of the hash from positions r+1 to r+SourceScale are all zero, is the low order r bits used to set the corresponding position in the Source BitMap. For example, if SourceScale is initially 3 and r is 32, essentially all but the low order 35 bits of the hash are ignored and the low order 32 bits of the 35 bits are focused on, a scaling of $2^{\wedge}(35-32)=2^{\wedge}3=8$.

The interval is over at 686. At 688, the counter is cleared, and source scale is incremented by some amount. If in the next interval, in the same example, the scale factor goes up to 4, the scaling focuses on the top 36 bits of the hash, giving a scaling of $2^{\wedge}4=16$. Thus by incrementing SourceScale by 1, the amount of sources that can be counted is doubled. Thus when comparing against the threshold for sources in 675, the number of bits in SourceHash is scaled by a factor of $2^{\wedge}(SourceScale-1)$ before being compared to the threshold.

Note that this same technique is used not only for sources, as described, but also for destinations in 665, 670 and 675.

Scanning Test: A special kind of scanning test can also be carried out at 245. Unlike previous scanning systems, here both the content and the source are used as keys for the test, as compared with previous systems that tested merely the source. Tests are made for content that is being sent to unused addresses (of sources that disburse such content and send to unused addresses) and not solely sources. A guilt score is assigned to pieces of "bad" content, though as a side-effect, the individual stations disbursing the bad content may be tagged. Notice also that the exploit in a TCP-based worm will not be sent to these addresses because a connection cannot be initiated without an answer from the victim Noticing a range of probes to an unused space: A source may make several attempts to an inactive address or port by mistake. A hundred attempts to a single unused address or port is less suspicious than a single attempt to each of a hundred unused addresses/ports. Thus rather than counting just counting the number of attempts to unused addresses, it may also be useful to get an estimate of the range of unused addresses that have been probed.

To implement these augmentations scalably, a representation of the set of the unused addresses/ports of an enterprise or campus network is maintained. For scalability, unused addresses can be done compactly using a bitmap (for example, for a Class B network, 64K bits suffices) or Bloom Filter or as described in L. Fan, P. Cao, J. Almeida, and A. Broder. Summary Cache: A Scalable wide-area Web cache sharing protocol SIGCOMM 98, 1998. The list can be dynamically validated. Initial guesses about which addresses spaces are being used can be supplied by a manager. This can easily be dynamically corrected. For example, whenever an address S thought to be unassigned sends a packet from the inside, that address should be updated to be an assigned address. Note that in the special case of a contiguous address space, a simple network mask suffices.

A scalable list of unused ports can be kept by keeping an array with one counter for each port, where each array entry is a counter. The counter is incremented for every TCP SYN sent or each RESET sent, and decremented for every TCP FIN or FIN-ACK sent. Thus, if a TCP-based attack occurs to a port and many of the machines it contacts are not using this port, TCP FINs will not be sent back by these machines, or they will send TCP resets. Thus, the counter for that port will increase. Some care must be taken in implementing this technique to handle spoofing and asymmetrical routing, but even the simplest instance of this method will work well for most organizations.

A "blacklist" of sources that have sent packets to the unused addresses or ports in the last k measurement periods. This can be done compactly via a Bloom Filter or a bitmap. A hashed bit map can also be maintained, (similar to counting sources above) of the inactive destinations probed, and the ports for which scanning activity is indicated.

For each piece of frequent content, the mechanism keeps track of the range of sources in the blacklisted list associated with the content. Once again, this can be done scalably using a hashed bitmap as described herein.

Figure 7:
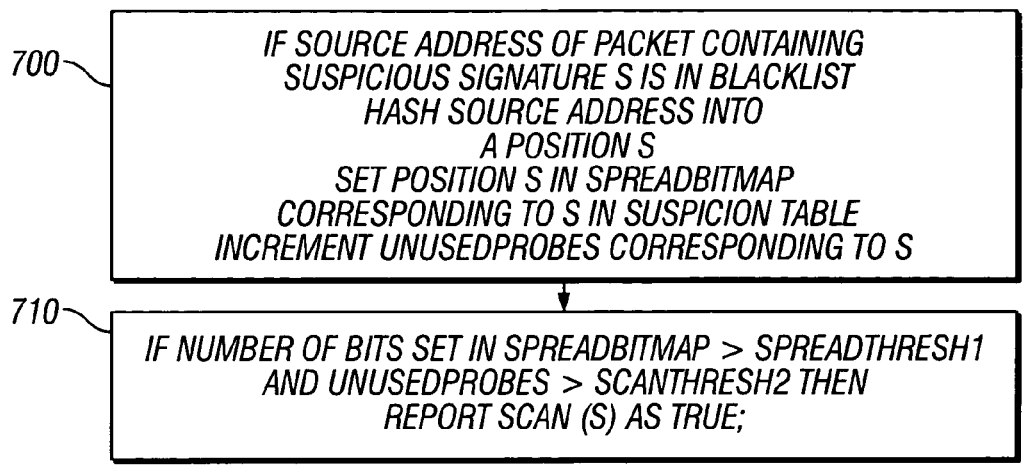
FIG. 7 shows a block diagram of the scan test.

FIG. 7 shows testing for content of scanning. Again, this assumes a suspicious signature S at 700, the source address is hashed into a position S within the table. At 710, when the number of bits set within that suspicion table exceeds a threshold, then the scanning is reported as true.

Code Test:

Code can also be detected at 245. This can be used with a packet code test shown in FIG. 8a. Within the suspicious sample, at each offset, a code test is run at 800. When code is detected to be over a specified length, the code test is reported to be positive at 805.

The code test can simply be a disassembler run on the packet at each of the plurality of offsets. Most worms and the like use 8086 code segments. Therefore, an 8086 disassembler can be used for this purpose.

Figure 8B:
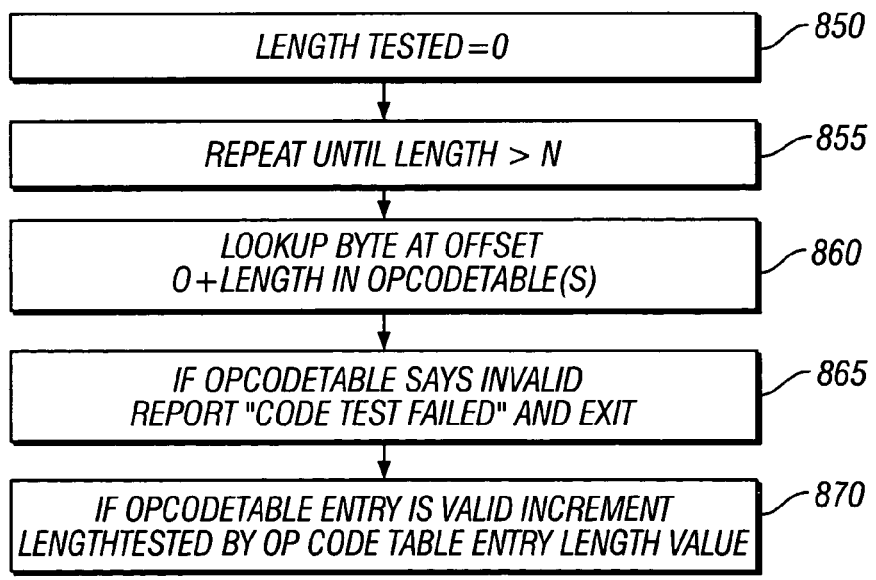

FIG. 8b shows an alternative technique of looking for opcodes and associated information associated with the opcodes. The opcodes may be quite dense, leaving only a few codes that are clearly not 8086 codes. Each opcode may have associated special information following the code itself. While a small amount of data may look like code, because of the denseness of the opcodes, it is quite unlikely that large strings of random data look like codes. For example, if 90% of the opcodes are assigned, a random byte of data has a 90% chance of being mistaken for a valid opcode; however, this is unlikely to keep happening when measured over say 40 bytes of data that each of the appropriate bytes looks like a valid opcode.

This test, therefore, maintains a small table of all opcodes, and for each valid opcode, uses the length of the instruction to test whether the bits are valid. FIG. 8b shows starting at Offset O, doing a length test, at 850, and repeating until length greater than N for opcodes tests of length N. At 860, each bit at offset O along with its length in the opcode table, is looked up. If the opcode table indicates that the byte is invalid, the code test is indicated as failed, and exits at 865. If the opcode table entry is valid, the length test is incremented by the opcode table entry length value at 870, and the process continues.

The system thus checks for code at offset O by consulting the table looking for a first opcode at O. If the opcode is invalid, then the test fails, and the pointer moves to test the next offset.

However, if the opcode is valid, then the test skips the number of bytes indicated by the instruction length, to find the next opcode, and the test repeats. If the test has not failed after reaching N bytes from the offset O, then the test has succeeded.

This test can be carried out on each string, using only 8086 and unicode, since most of the attacks have been written in these formats. It should be understood, however, that this may be extended to other code sets, should that be necessary.

The code test can be combined with the frequent content test as a final confirmatory test of whether a piece of frequent content contains at least one fragment of code. In another alternative, the code detection can be used to form a front end for the frequent content. Only content that has a code segment of size N or more is therefore considered for frequent content testing.

Figure 9:
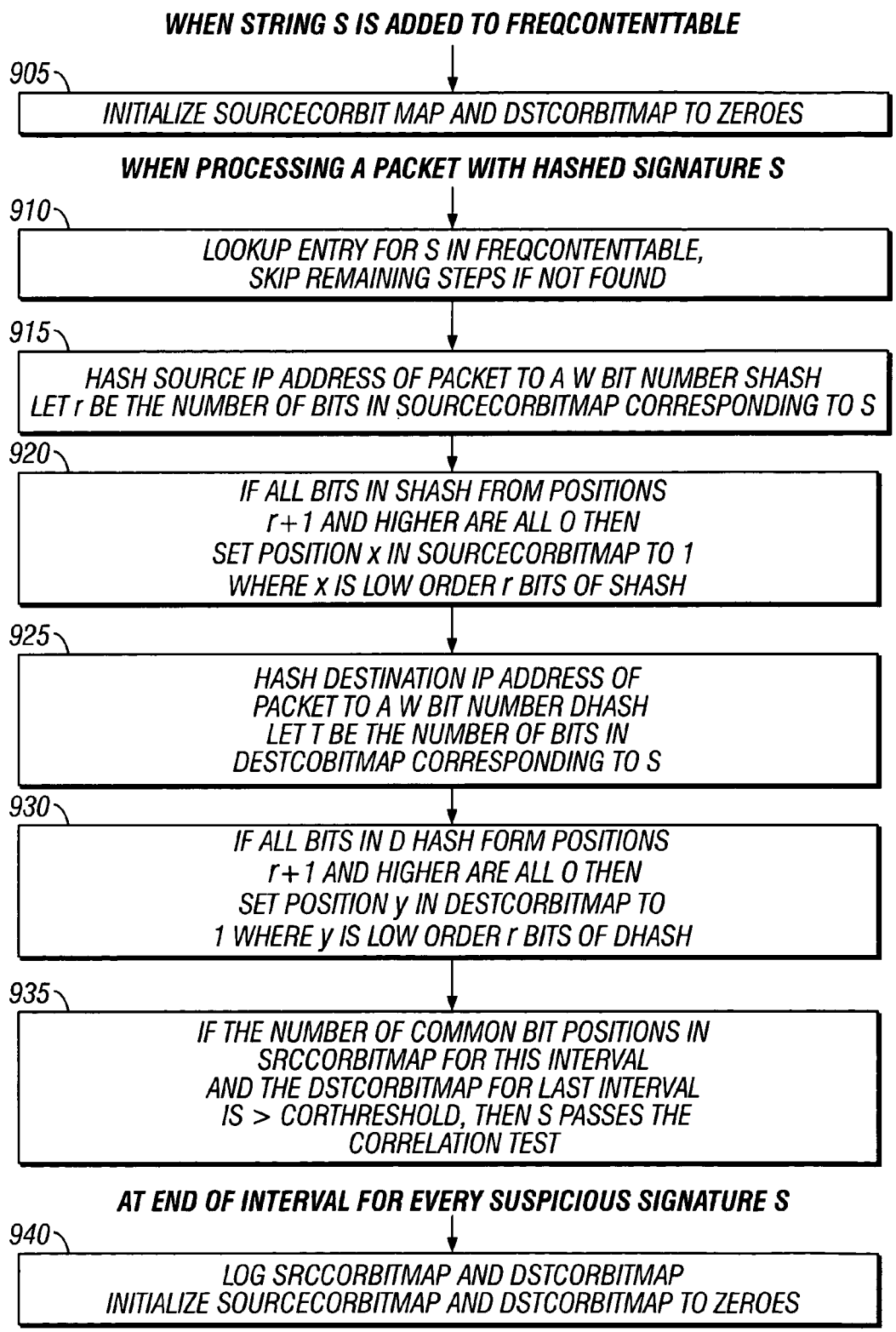
FIG. 9 shows the correlation test.

Correlation Test:

The following correlation test can be used in 245 to scalably detect the correlation between content sent to stations in one interval, and content sent by these sources in the next interval. As this is a likely sign of an infection, it adds to the guilt score assigned to a piece of content, if this test is passed. A scalable method of doing this is shown in FIG. 9.

In 905, a bitmap for sources and a bitmap for destinations are initialized to "0" whenever a new signature is added to the frequent content table. A similar initialization occurs at the end of every interval as shown in 940. The concepts used are very similar to those for detecting spreading content in FIG. 6 and similar bitmaps are used. To distinguish them, these bitmaps are called SourceCorBitMap and DstCorBitMap instead of SrcBitMap and DstBitMap as in FIG. 6.

In an analogous way for FIG. 6, S is checked against a frequent content table at 910 in that a sample of sources are kept track as hashed bits in the source bitmap (915, 920) and a similar sample is kept track for destinations (925, 930). However, there is preferably no scale factor in the correlation test in FIG. 9.

A test for correlation at 935 compares the bit positions set in the source bitmap for this interval with the bit positions set in the destination bitmap for the previous interval. If a large number of bits are set in common, it is clear that of the sample of destinations that received the content in the last interval, a significant fraction is sending the same content in this interval, and the content passes the correlation test in 935.

The source and destination bitmaps of an interval are logged in 940 at the end of an interval and the counters are reset.

Another one of the additional checks shown as 245 is the Spam test shown in FIG. 10. An additional check carried out during the Spam test is to pass a so-called Bayesian Spam test of conventional type. The Bayesian test may heuristically analyze the content to determine if the suspected content is in fact Spam according to the Bayesian rules.

The packet testing described in FIG. 2 can be carried out at any vantage links, e.g., where the enterprise communicates with the ISPs. The vantage links typically include a router, and according to the present system, a large-scale intrusion detection prevention device of the type disclosed herein operates within that router.

Two different sample combinations of the way that this can be used in a network configuration are respectively shown in FIGS. 11A and 11B. FIG. 11A shows in-line configuration systems 1100 and 1102 connected on respective sides of a router 1104. As an alternative or additional operation, a tap Configuration detection system 1110 may be used. The in-line system may have a function of actually blocking desired signatures, since it is actually in-line between the vantage link and the computer. The tap detection system does not actually block anything, but monitors the network contents and provides a signature as 1112 to the router 1104. The signature 1112 represents content that should be blocked by the router. All of these are in contact with the vantage link shown as 1099, which actually represents any connection to a public Internet of any sort.

FIG. 11b shows an alternative connection in which the signatures are collected and sent to a central consolidator for processing. An advantage of this system is that different network portions from different locations can be collected, thereby providing a better sample of total network traffic. The private network 1150 is shown with a router 1152 guarding the entrance to that private network. According to this system, a number of different detection systems 1160, 1161, and 1162 each are located in either in-line or tap configurations on various networks or network points. For example, the different systems 1160, 1161 and 1162 may guard the entrance to different network facilities. Each of these operates according to the systems described above, to create signatures of data portions as in 205.

The signatures from each of these devices, representing either the data, or the reduced data, is sent to a consolidator 1170. The consolidator then carries out the additional tests of finding the frequent content 215; finding spreading content 230, and additional tests 245. This has the advantage that a piece of content, while not passing the tests at any one device, still passes the tests when viewed across all the devices. Alternately, signatures 1164 or from device 1160, signatures 1165 from device 1161, and signatures 1166 from device 1162. The consolidated signature 1171 provides a consolidated signature the blocking to router 1152. More generally, however, any part of the intrusion detection system/intrusion prevention system, may generate signatures, that is bit patterns corresponding to the offensive content of the attack or undesired content, and the entire solution could distributed in various ways.

Other implementations, besides those specifically disclosed above, are within the scope of the following claims.

For example, although the above has described hashing, any technique, mathematical or otherwise, can be used for this data reduction so long as it follows the techniques disclosed above. Moreover, although the above has described only a few tests, which are representative of today's kinds of intrusions, other tests can be added in the future.

All such implementations and modifications are intended to be encompassed within the following claims.

What is claimed is:

1. A machine-implemented method for automatically identifying new signatures to use in identifying a previously unknown intrusive network attack, comprising:
   obtaining a collection of data items to be analyzed to identify the network attack, wherein said data items are parts of messages that were sent over a data network;
   reducing said data items in said collection to reduce said data collection to a reduced data collection of reduced data items, wherein the reduced data items in the reduced data collection have a smaller size and a constant predetermined relation with data items in the data collection and at least some of the data items in the data collection that differ are reduced to the same reduced data item;
   analyzing a plurality of said reduced data items to detect common elements in the plurality of said reduced data items, said analyzing identifying common content indicative of the previously unknown network attack; and
   sending the common content to one or more of a signature blocker and a signature manager for use as a new signature in identifying the previously unknown intrusive network attack.

2. A method as in claim 1, wherein said analyzing comprises determining frequently occurring sections of message information.

3. A method as in claim 2, further comprising, after said analyzing determines said frequently occurring sections of message information, carrying out an additional test on said frequently occurring sections of message information.

4. A method as in claim 3, wherein said carrying out the additional test comprises looking for an increasing number of at least one of sources and destinations of said frequently occurring sections of message information.

5. A method as in claim 3, wherein said carrying out the additional test comprises looking for code within the frequently occurring sections.

6. A method as in claim 5, wherein said detecting code comprises:
   looking for a first valid opcode at a first location;
   based on said first valid opcode, determining a second location representing an offset to said first valid opcode; and
   looking for a second valid opcode at said second location.

7. A method as in claim 6, further comprising establishing that a first section includes code when a predetermined number of valid opcodes are found at proper distances.

8. A method as in claim 3, wherein said carrying out the additional test comprises:
   maintaining a first list of unassigned addresses;
   forming a second list of sources that have sent to addresses on said first list; and
   comparing a current source of a frequently occurring section to said second list.

9. A method as in claim 8, wherein said carrying out the additional test comprises reducing addresses in said first list and said second list to reduced addresses, wherein the reduced addresses have a smaller size and a constant predetermined relation with the addresses and at least some of the addresses that differ are reduced to the same reduced address.

10. A method as in claim 8, wherein said portion of a network header comprises a port number indicating a service requested by a network packet.

11. A method as in claim 10, wherein said port number comprises a source port or a destination port.

12. A method as in claim 3, wherein said carrying out the additional test comprises:
   first monitoring a first content sent to a destination;
   second monitoring a second content sent by said destination; and
   determining a correlation between said first content and said second content.

13. A method as in claim 12, wherein:
   said first monitoring comprises monitoring multiple destinations; and
   said second monitoring comprises monitoring multiple destinations during a different time period than said first monitoring.

14. A method as in claim 13, wherein said first and second monitoring comprises:
   reducing information about said destinations; and
   storing at least one table about said data reduced information.

15. A method as in claim 2, wherein said determining frequently occurring sections comprises:
   using at least first, second, and third data reduction techniques on each said data item to obtain at least first, second and third reduced data items;
   counting said first, second, and third reduced data items; and
   establishing said frequently occurring sections when all of said at least first, second, and third reduced data items have a frequency of occurrence greater than a specified amount.

16. A method as in claim 2, wherein said reducing said data items and said determining frequently occurring sections comprises:
taking a first hash function of said data items;
first maintaining a first counter, with a plurality of stages, and incrementing one of said stages based on an output of said first hash function;
taking a second hash function of said data items; and
second maintaining a second counter, with a plurality of stages, and incrementing one of said stages of said second counter based on an output of said second hash function.

17. A method as in claim 16, further comprising:
checking said one of said stages of said first counter and said one of said stages of said second counter against a threshold; and
identifying a first reduced data item as associated with frequently occurring content only when both said one of said stages of said first counter and said one of said stages of said second counter are both above said threshold.

18. A method as in claim 17, further comprising adding the first reduced data item to a frequent content buffer table.

19. A method as in claim 18, further comprising:
taking at least a third hash function of said data items; and
incrementing a stage of at least a third counter based on said third hash function,
where said identifying said first reduced data item as associated with frequently occurring content only when all of said stages of each of said first, second, and third counters are each above said threshold.

20. A method as in claim 16, further comprising:
obtaining said data items by taking a first part of messages; and
subsequently obtaining new data items by taking a second part of the messages.

21. A method as in claim 20, wherein at least one of said hash functions comprises an incremental hash function.

22. A method as in claim 1, wherein said analyzing comprises determining that increasing number of sources and destinations are sending and/or receiving data.

23. A method as in claim 22, wherein reducing said data items comprises:
hashing at least one of the source or destination addresses to form a collection of hash values;
first determining a unique number of said hash values; and
second determining a number of said one of source or destination addresses based on said first determining.

24. A method as in claim 23, further comprising scaling the hash values prior to said second determining.

25. A method as in claim 24, wherein said scaling comprises:
scaling by a first value during a first counting session; and
scaling by a second value during a second measurement session.

26. A method as in claim 1, further comprising analyzing for the presence of a specified type of code within said collection of data.

27. A method as in claim 1, wherein said reducing said data items comprises carrying out a hash function on said data items.

28. A method as in claim 1, wherein said collection of data items comprises a portion of the network payload.

29. A method as in claim 28, wherein said collection of data items further comprises a portion of a network header.

30. A method as in claim 1, wherein:
said data items comprise a first subset of a network packet including payload and header; and
the method further comprises obtaining a second subset of the same network packet for subsequent analysis.

31. A method as in claim 1, further comprising forming a plurality of data items from each of a collection of network packets, each of said plurality of data items comprising a specified subset of the network packets.

32. A method as in claim 1, further comprising forming a plurality of data items from each of a collection of network packets, each of said plurality of data items comprising a continuous portion of payload and information indicative of a port number indicating a service requested by the network packet.

33. A method as in claim 1, further comprising:
determining a list of first computers that are susceptible to a specified attack; and
monitoring only messages directed to said first computers for said specified attack.

34. The method of claim 33, where said monitoring comprises checking for a message that attempts to exploit a known vulnerability to which a computer is vulnerable as said specified attack.

35. A method as in claim 34, wherein said checking comprises checking for a field that is longer than a specified length.

36. The method of claim 1, wherein obtaining the collection of data items comprising obtaining the collection at a vantage link that includes a router.

37. A machine-implemented method for automatically identifying new signatures to use in identifying a previously unknown intrusive network attack, comprising:
monitoring network content on a network and obtaining at least portions of the data on said network;
data reducing said portions of the data using a data reduction function which reduces said portions of the data to reduced data portions in a repeatable manner such that each portion which has the same content is reduced to the same reduced data portion and at least some of the portions that differ are reduced to the same reduced data portion;
analyzing said reduced data portions to find network content which repeats a specified number of times in order to establish said network content which repeats said specified number of times as frequent content;
identifying address information of said frequent content, wherein the address information includes at least one of source information or destination information that characterizes the respective of sources and/or destinations of said frequent content and determining if a number of sources and/or destinations of said frequent content is increasing;
identifying the frequent content as associated with the previously unknown network attack based on said identifying and determining, and
sending the frequent content to one or more of a signature blocker and a signature manager.

38. A method as in claim 37, wherein said monitoring network content comprises obtaining both portions of the data on the network and portnumbers indicating services requested by network packets.

39. A method as in claim 38, wherein said obtaining portions of the network data comprises:
defining a window which samples a first portion of network data at a first time in accordance with a position of the window; and sliding said window to a second position at a second time which samples a second portion of said network data, wherein said second position has a specified offset from the first portion.

40. A method as in claim 39, wherein said data reduction function comprises a hash function.

41. A method as in claim 40, wherein said data reduction function comprises an incremental hash function.

42. A method as in claim 37, wherein data reducing said portions comprises using said data reduction function in a scalable configuration.

43. A method as in claim 37, wherein said identifying comprises:
second data reducing said address information using a data reduction function; and
maintaining a table of data reduced address information.

44. A method as in claim 43, wherein said second data reducing comprises hashing said address information.

45. A method as in claim 37, further comprising testing contents of the frequent content to determine the presence of code in said frequent content.

46. A method as in claim 45, wherein said testing contents comprises:
identifying an opcode in said frequent content;
determining a length of the opcode; and
looking for another opcode at a location within said frequent content based on said length.

47. A method as in claim 37, further comprising monitoring for scanning of addresses.

48. The method of claim 37, wherein monitoring the network content comprises monitoring the network content at a vantage link that includes a router.

49. A machine-implemented method for automatically identifying new signatures to use in identifying a previously unknown intrusive network attack, comprising:
obtaining a collection of data items to be analyzed to identify the previously unknown network attack;
reducing said data items in said collection to reduce said data collection to a reduced data collection of reduced data items, wherein the reduced data items in the reduced data collection have a smaller size and a constant predetermined relation with data items in the data collection and at least some of the data items in the data collection that differ are reduced to the same reduced data item;
analyzing a plurality of said reduced data items to determine frequently occurring sections of message information indicative of a network attack;
carrying out an additional test on said frequently occurring sections of message information, comprising
maintaining a first list of unassigned addresses, wherein the unassigned addresses are maintained as reduced addresses that have a smaller size and a constant predetermined relation with the unassigned addresses and at least some of the unassigned addresses that differ are reduced to the same reduced address,
forming a second list of source addresses that have sent to the unassigned addresses on said first list, wherein the source addresses are maintained as reduced addresses that have a smaller size and a constant predetermined relation with the source addresses and at least some of the source addresses that differ are reduced to the same reduced address, and
comparing a current source of a frequently occurring section to said second list; and
based on the additional test, sending some of the frequently occurring sections to one or more of a signature blocker and a signature manager.

50. A machine-implemented method for automatically identifying new signatures to use in identifying a previously unknown intrusive network attack, comprising:
obtaining a collection of data items to be analyzed to identify the network attack, wherein said data items comprise a first subset of a network packet including payload and header;
reducing said data items in said collection to reduce said data collection to a reduced data collection of reduced data items, wherein the reduced data items in the reduced data collection have a smaller size and a constant predetermined relation with data items in the data collection and at least some of the data items in the data collection that differ are reduced to the same reduced data item;
analyzing a plurality of said reduced data items to detect common elements, said analyzing reviewing for common content indicative of a network attack;
obtaining a second subset of the same network packet for subsequent analysis; and
based on the subsequent analysis, sending some of the common content to one or more of a signature blocker and a signature manager.

* * * * *